US011577939B2

United States Patent
Bock et al.

(10) Patent No.: US 11,577,939 B2
(45) Date of Patent: Feb. 14, 2023

(54) CONTROLLER FOR A LIFTING DEVICE, AND METHOD FOR OPERATING SAME

(71) Applicant: SIEMENS AKTIENGESELLSCHAFT, Munich (DE)

(72) Inventors: Marco Bock, Erlangen (DE); Uwe Ladra, Erlangen (DE); Fabian Lorz, Röttenbach (DE)

(73) Assignee: Siemens Aktiengesellschaft, Munich (DE)

( * ) Notice: Subject to any disclaimer, the term of this patent is extended or adjusted under 35 U.S.C. 154(b) by 268 days.

(21) Appl. No.: 16/644,841

(22) PCT Filed: Sep. 4, 2018

(86) PCT No.: PCT/EP2018/073673
§ 371 (c)(1),
(2) Date: Mar. 5, 2020

(87) PCT Pub. No.: WO2019/048401
PCT Pub. Date: Mar. 14, 2019

(65) Prior Publication Data
US 2021/0107774 A1    Apr. 15, 2021

(30) Foreign Application Priority Data

Sep. 8, 2017 (EP) ..................... 17190169

(51) Int. Cl.
*B66C 13/06* (2006.01)
*B66C 13/08* (2006.01)
(Continued)

(52) U.S. Cl.
CPC ............ *B66C 13/08* (2013.01); *B66C 13/063* (2013.01); *B66C 13/22* (2013.01); *G05B 19/416* (2013.01);
(Continued)

(58) Field of Classification Search
CPC ..... B66C 13/06; B66C 13/063; B66C 13/085; B66C 13/48
See application file for complete search history.

(56) References Cited

U.S. PATENT DOCUMENTS 5,642,822 A * 7/1997 Monzen ................ B66C 13/063
340/685
5,908,122 A    6/1999 Robinett et al.
(Continued)

FOREIGN PATENT DOCUMENTS

CN    1697777 A    11/2005
CN    103303798 A    9/2013
(Continued)

OTHER PUBLICATIONS

DE 19918449 Machine Translation (Year: 2000).*
(Continued)

*Primary Examiner* — Michael R Mansen
*Assistant Examiner* — Juan J Campos, Jr.
(74) *Attorney, Agent, or Firm* — Henry M. Feiereisen LLC

(57) ABSTRACT

A controller controls a plurality of drives of a lifting device, wherein the controller is configured to perform a kinematic transformation of spatial position and orientation coordinates of a body and controls the drives based on the kinematic transformation. The drives can be electric drives. At least six drives are provided and regulated, so that their number exceeds the number of spatial position and orientation coordinates of the body. The lifting device is thus overdetermined.

18 Claims, 5 Drawing Sheets

(51) Int. Cl.
*B66C 13/22* (2006.01)
*G05B 19/416* (2006.01)

(52) U.S. Cl.
CPC .............. *G05B 2219/40043* (2013.01); *G05B 2219/45046* (2013.01)

(56) References Cited

U.S. PATENT DOCUMENTS

| | | | | |
|---|---|---|---|---|
| 6,135,301 | A * | 10/2000 | Monzen | B66C 13/06 212/275 |
| 6,345,724 | B1 * | 2/2002 | Masumoto | B66C 13/06 212/320 |
| 2006/0054581 | A1 | 3/2006 | Sorsa | |
| 2013/0245815 | A1 | 9/2013 | Schneider et al. | |
| 2018/0339888 | A1 * | 11/2018 | Staudecker | B66C 13/063 |

FOREIGN PATENT DOCUMENTS

| | | |
|---|---|---|
| CN | 106044567 A | 10/2016 |
| DE | 2002745 A1 | 8/1971 |
| DE | 19918449 A1 | 11/2000 |
| EP | 2902356 A1 | 8/2015 |
| WO | WO 2016161470 A1 | 10/2016 |

OTHER PUBLICATIONS www.mathworks.com website definition of Overdetermined Linear Equations (cited in Remarks of Jul. 11, 2022). Note: Remarks only provide website, no document of definition was provided by Applicant. (Year: 1994).* www.math.uwaterloo.ca/~jmckinno/Math225/Week/Lecture2i.pdf website definition of Overdetermined Linear Equations (citing in Remarks of Jul. 11, 2022). Note: Remarks only provide website, no document of definition was provided by Applicant. (Year: NA).*

Kraus, Werner: "Force Control of Cable-Driven Parallel Robots"; in: Stuttgarter Beiträge zur Produktionsforschung, vol. 49, pp. 1-170; by Fraunhofer Verlag, 2016; ISSN: 2195-2892; ISBN (Print): 978-3-8396-0979-8.

PCT International Examination Report and Written Opinion of International Examination Authority dated Dec. 14, 2018 corresponding to PCT International Application No. PCT/EP2018/073673 filed Sep. 4, 2018.

\* cited by examiner

CONTROLLER FOR A LIFTING DEVICE, AND METHOD FOR OPERATING SAME

CROSS-REFERENCES TO RELATED APPLICATIONS

This application is the U.S. National Stage of International Application No. PCT/EP2018/073673, filed Sep. 4, 2018, which designated the United States and has been published as International Publication No. WO 2019/048401 A1 and which claims the priority of European Patent Application, Serial No. 17190169.7, filed Sep. 8, 2017, pursuant to 35 U.S.C. 119(a)-(d).

BACKGROUND OF THE INVENTION

The invention relates to a controller for a lifting device, in particular a lifting cable installation, and a method for operating the lifting device in particular for controlling said lifting device, wherein here the term "a control procedure" is also understood to mean "a closed-loop control procedure". The invention also relates to a computer program product that is embodied so as to implement the method and the invention likewise relates to a lifting device.

Lifting devices are by way of example cranes, portal cranes, container cranes, STS cranes, lifting installations, lifting cable installations etc. Lifting devices have in particular a lifting cable installation. Lifting devices are in particular used so as to lift and/or move bodies, which may also be referred to as a load. In this case, the body is in particular not fixedly guided but rather lifted in a freely suspended or suspended manner. The body is in particular a container and/or a spreader beam for lifting a container.

EP 2 902 356 A1 discloses a method for damping a pendulum movement of a load on a crane in which a lift drive of a cable is controlled. The load is tilted via the cable during the pendulum movement in order to produce a torque that counteracts the pendulum movement. Alternatively, the center of gravity of the load is raised and/or lowered in order to counteract the pendulum movement.

The publication DE 20 02 745 A1 discloses a method for suppressing pendulum movements of a load that is suspended on a crane. In this case, a speed of a crane trolley is adjusted to an average period duration of the swinging load. In a first range of the first period, a maximum acceleration is performed and in the last range of the last period an identically high deceleration of the crane trolley is performed.

WO 2016/161470 A1 discloses a transporting facility for transporting at least one container or another load, wherein the transporting facility has at least one crane trolley and at least one load receiving apparatus and at least eight lifting cables, and the load receiving apparatus has connecting facilities for fastening the container or the other load and said load receiving apparatus hangs by means of the lifting cables on the crane trolley in a manner in which said load may be raised and may be lowered, wherein the lifting cables may be wound onto the cable drums that are rotatably mounted on the crane trolley, wherein each lifting cable may be wound and/or is at least in part wound on a dedicated cable drum and the rotational speed and/or the rotational direction may be respectively individually set in the case of all the cable drums.

The Stuttgarter Beiträge zur Produktionsforschung [The Stuttgart Journal of Production Research] discloses an article regarding the topic "Force Control of Cable-Driven Parallel Robots" by Werner Kraus. In this dissertation, a class of robots that uses cables for transmitting force is studied. Since cables only transmit pulling forces, exacting demands are imposed on the closed-loop control procedure of the so-called parallel cable robots. The cable robots that are the foundation in this work comprise more cables than degrees of freedom of movement of the platform and therefore belong to the class of redundant robots. The redundancy renders it possible to tension the cables against one another. In this work, initially an approach is proposed for the closed-loop control procedure of the platform position and a synchronous closed-loop control procedure of the cable forces. For this purpose, dynamic models are developed on the basis of the elastic cables and the forward kinematics are also extended. It is possible using the proposed method for calculating the cable forces to set the internal tension of the cables in an infinitely variable manner. The studies show that the natural frequencies of the platform may be shifted by 15-30% by way of changing the pretension. It is possible by way of selecting a low cable tension to reduce the energy consumption in the case of the remaining power of the robot by up to 20%. In order to verify the closed-loop control concept, the positional accuracy of the robot is experimentally studied. The open-loop control procedure of the robot on the basis of a geometric model, which does not comprise closed control circuits for the platform position and the cable forces, is used as a reference. In the center of the operating space, it was possible using both approaches to achieve a comparable accuracy using a carrying capacity of 80 kg of approximately 70 mm and 2.5°. It is also possible on the edge of the operating space to achieve a comparable accuracy using the proposed method since the cables are held under stress. For operating processes such as for example hauling procedures and known hybrid position closed-loop control procedures and force closed-loop control procedures for cable robots transmit. It is possible using the closed-loop control procedure approach for the robot platform to apply a contact force in a desired direction while the platform may move in the remaining directions in a positionally-controlled manner. An admittance closed-loop control procedure is proposed for the human-robot cooperation. In this case, the platform simulates a spring mass damper system with the aid of which a virtual operating space is realized. The evaluation shows that a bandwidth up to 13 Hz may be represented.

In the field of lifting devices there is growing demand for an improved operating method by way of which by way of example an improved utilization of cables is possible. As a consequence, by way of example it is also possible to use electric drives of a lower power. During operation, the demands placed on the mechanical and/or electrical components that are used are to be reduced.

Cranes are used for transporting containers. Rapid and more precise positioning in all the spatial directions and all the directions of rotation are necessary both when the container is received using the spreader beam (suspended on cables) as well as when the container is placed on for example a truck or on a container stack. It is not possible to realize all the movement directions by way of the typical crane axis trolley, lifting installation and gantry (the latter only provided in the case of stack cranes or portal cranes). At least the rotations of the spreader beam/container are therefore not possible at this time. For this reason, cranes are fitted with additional systems in order to realize these rotational movements. In the case of STS cranes (in particular for loading and/or unloading a ship), these are hydraulic cylinders that modify the positions of individual cables of the lifting installation (lifting installation cables).

In the case of stack cranes (in particular for arranging or rearranging containers in the rear region of the terminal) hydraulic cylinders are mounted on the spreader beam.

An object of the invention is to improve a lifting device, in particular an object is to improve the handling procedure using a lifting cable installation.

SUMMARY OF THE INVENTION

A solution of the object is achieved by a controller for a lifting device, wherein the controller includes a kinematic transformation, wherein a spatial position of a body and an orientation position of the body is provided for the transformation, wherein a plurality of electric drives may be controlled, wherein the lifting device is overdetermined for a movement of the body (8, 9) by way of the lifting device.

A solution of the object is also achieved by a method for controlling a lifting device wherein a kinematic transformation of coordinates of a body is used for the closed-loop control procedure of at least six drives.

Further embodiments are apparent by way of example as claimed in the dependent claims.

A controller for a lifting device has a kinematic transformation. In this case, a spatial position of a body and an orientation position of the body are provided for the transformation. The controller is provided for the open-loop control procedure and/or closed-loop control procedure. It is possible by means of the controller to control a plurality of electric drives. The controller may in other words perform open-loop control tasks and/or closed-loop control tasks and has in particular at least one processor, a storage device and a plurality of outputs and/or inputs. The outputs and/or inputs may also be realized via a bus system to which it is possible to connect the controller. The body is in particular a load, such as for example a spreader beam, a container, a spreader beam with a container, etc. The controller may be realized as a unit or as a combination of at least two units, in other words a plurality of units, which are connected to one another in a data-technical manner. This is achieved by way of example via a back panel bus, via a bus cable, via a radio connection etc. The controller is embodied so as to perform open-loop control procedures and/or closed-loop control procedures. In particular, the controller is embodied in such a manner that up to 6 degrees of freedom of a body (below also called a load), in particular of a rigid body, in other words in particular the position (XC,YC,ZC) (hereafter also referred to as spatial position) and the orientation ($\alpha,\beta,\gamma$) (hereafter also referred to as orientation position) may be influenced in the space. The position, or in the case of a movement the positions, may be represented mathematically using $p=[XC,YC,ZC,\alpha,\beta,\gamma]^T$. The controller is in particular provided so as to position or move a body using cable kinematics, in particular parallel cable kinematics using m cables that may be controlled separately. The body may then be positioned exactly or where applicable may be guided on a predetermined course. For the cable kinematics that are taken into consideration, the six degrees of freedom that are described correspond to the load coordinates, while the position of the m drives may be taken into consideration in the drive coordinate system. The drives have in particular electric motors, which may be controlled in a closed-loop manner. An electric motor forms a drive train with a pulley for a cable or with a gearing mechanism or with a pulley block etc. Torques $d=[d_1, \ldots, d_m]^T$ may be provided via the m drive trains in order to guide a path (in particular a cable lifting installation) and/or the body (load) on the predetermined course. An optimized torque curve $d_{ffw}=[d_{ffw,1}, \ldots, d_{ffw,m}]^T$ is calculated for this course by way of example by the open-loop control procedure, with the aid of a mathematical model. If, by way of example, a feedforward control procedure is used, it is possible for the feedforward control procedure of the rotational speed $n_{desired}=[n_{desired,1}, \ldots, n_{desired,m}]^T$ with the aid of the kinematic transformation to transfer the desired speeds from the six-dimensional coordinate system of the load into the m-dimensional coordinate system of the drives. The kinematics of the lifting device system are in particular non-linear.

In one embodiment of the controller, the lifting device is overdetermined for a movement of the body by way of the lifting device. In this case, in particular an optimizing device is provided so as to optimize cable forces. This is also achieved in particular by way of using a feedforward control procedure.

The controller for a lifting device or the lifting device, in particular a lifting device for a container, is advantageously overdetermined. In particular, the lifting device has more drives than degrees of freedom. The movement of the container may thus be better controlled.

In the case of a lifting device, in particular having lifting cables, it is possible to realize a mechanical system in which the lifting installation cables are fastened to multiple cable rolls (that are respectively moved by way of electric drives). By way of example, the spreader beam and/or container may be moved in more or fewer degrees of freedom in dependence upon the number of cables and cable rolls. The controller is embodied for the open-loop control procedure and/or closed-loop control procedure of a system of this type in order to realize a positioning movement. In one embodiment of a controller, for example a sequence cascade is created for the open-loop control procedure and/or closed-loop control procedure of such systems, said sequence cascade having the following functions: trajectory calculation for container and/or spreader beam, kinematic transformation, cascade closed-loop control procedure of the (electric) drive.

In one embodiment of the controller, this controller has a closed-loop position controller, wherein the closed-loop position controller has in particular an input for the spatial position and an input for the orientation position. The closed-loop position controller is in particular embodied in such a manner that this closed-loop position controller has one part closed-loop position controller for each of the three spatial coordinates, and also a part closed-loop position controller for the orientation.

In one embodiment of the controller, this controller has a first model for the body. By way of example, rotational speeds $n_{desired}$ and torques $d_{ffw}$ that are determined in the feedforward control paths are connected via the first model, which is in particular realized as a mathematical model, to the respective comparators of the closed-loop control loops. It is thus possible to control six, seven, eight or more electric drives in a closed-loop manner. The closed-loop control concept in particular controls the closed-loop control deviations that result from model inaccuracies and malfunctions. In this case, the closed-loop drive control procedure operates in particular in the drive coordinate system and the closed-loop position control procedure operates in the coordinate system of the load.

In one embodiment of the controller, an optimized torque feedforward control procedure $d_{ffw}=[d_{ffw,1}, \ldots, d_{ffw,m}]^T$ is calculated with the aid of a mathematical load model for the m drive units (in particular m=8). The mass of the load and the position of the center of mass are known for this purpose.

In one embodiment of the controller, a load model is used. The forces that act upon the load are calculated using a six-dimensional movement equation $$w = M(p)\ddot{p} + N(\dot{p},p) + G(p)$$

with:
M(p) the mass matrix
$N(\dot{p},p)$ the matrix of the centrifugal force and Coriolis force
G(p) the matrix of the weight forces
from a desired course $(p,\dot{p},\ddot{p})$ in accordance with a trajectory p (t). The force vector w relates to the load coordinates.

It is possible using the equilibrium condition $A^T(p)F=w$ to transform a six-dimensional force vector w into a cable force vector F. The cable force vector $F=[F_1, \ldots, F_m]^T$ includes the amount of cable force of each cable in the direction of the drive coordinates. The equilibrium condition is established with the aid of the geometric arrangement of the cables. The matrix $A^T(p)$ Includes inter alia the m normalized cable force direction vectors and the position of the points of application of the force.

In one embodiment of the controller, this controller has a cable force calculator or a cable force calculating procedure. If multiple cables in the mechanical construction may be controlled separately as degrees of freedom of movement of the load m>6, the cable kinematics are overdetermined. There is therefore the possibility to distribute the force vector w onto the m cables according to determined optimization criteria. One optimization criterion is the minimization of the maximum cable force:

$$\min(\max(F))$$

with: $A^T(p)F=w,$ $$F>0$$

This criterion aims to keep the maximum force in the drive as low as possible in order to utilize the drive redundancy that is contained in the system for an advantageous dimensioning of the drive.

Another optimization criterion is the maximization of the minimal cable force:

$$\max(\min(F))$$

with: $A^T(p)F=w,$ $$F>0$$

This criterion aims to optimize the magnitude of tensioning. The cable kinematics are more robust and more rigid with an optimized magnitude of tensioning with respect to load pendulum movements and therefore also less susceptible to external disruptive influences such as for example wind.

If only the start position and end position are important for a load positioning procedure and it is only necessary for the degrees of freedom of the load (position and orientation in the space) to remain within a tolerance band during the movement procedure, these six degrees of freedom may be drawn upon for the optimization procedure. These additional degrees of freedom may be used in accordance with the above-mentioned criteria for the optimization procedure (optimized course) in order to obtain a further improvement in the cable force distribution.

In one embodiment of the controller, this controller has a second model for a drive train. This model relates by way of example to a drive train or a plurality of drive trains that in their entirety again form a common drive train. The optimized cable forces F are converted in this manner with the aid of the drive train model, for example in accordance with a model of the drive train, into the torques of the drive motors (for example m=8):

$$d = RF + I\ddot{\varphi}$$

with:
$I=\text{diag}[I_1, \ldots, I_m]$ Diagonal matrix moments of inertia of the drive
$\ddot{\varphi}=[\ddot{\varphi}_1, \ldots, \ddot{\varphi}_m]^T$ Angular acceleration of the m drive trains
$R=\text{diag}[r_1, \ldots, r_m]$ Diagonal matrix of the translation ratios.

The matrix R includes in particular all the gear ratios, the diameters of each individual cable drum, and also the translation ratio of a pulley block, said translation ratio occurring via the pulleys.

In one embodiment of the controller, this controller has a feedforward control procedure. An optimized torque feedforward control procedure $d_{ffw}$ is calculated for a given desired course $(p,\dot{p},\ddot{p})$ in load coordinates with the aid of the mathematical model. This relates in particular to eight electric drives for eight cables. The system is overdetermined by way of the eight cables. It is possible by way of the overdetermination to distribute the load and to draw upon the feedforward control procedure for the force feedforward control procedure. The load may be distributed by way of example equally onto the cables.

According to a method for the control procedure (in other words for the open-loop control procedure and/or closed-loop control procedure) of a lifting device, a kinematic transformation of coordinates of a body is used for the closed-loop control procedure of at least six drives. The control procedure of the lifting device in other words also relates to the closed-loop control procedure of said lifting device. The kinematic transformation is in particular non-linear. In one embodiment of the lifting device, this lifting device has seven or more electric drives for moving cables, which are provided for raising and/or lowering a load.

In one embodiment of the method, the coordinates relate to a spatial position of the body and an orientation position of the body.

In one embodiment of the method, a plurality of electric drives are provided so as to position the body, wherein an overdetermination is produced by way of the plurality of the electric drives, wherein the overdetermination is used to distribute forces that act upon cables.

In one embodiment of the method, the movement of the body (load) is predetermined by way of a trajectory.

In one embodiment of the method, coordinate values are input variables of a closed-loop position control procedure, wherein output variables of the closed-loop position control procedure are transformed, wherein at least one input variable of a closed-loop drive control procedure is based on at least one output variable of the kinematic transformation.

In one embodiment of the method, this method is used in the case of a lifting cable installation having multiple cables that are connected to the spreader beam that in turn receives the load, wherein each cable may be actuated separately via motor-driven cable winches. Multiple cables may also be guided together to a drive in such a manner that at least two drives are provided and wherein a measuring system for determining the position and orientation of the load in the space is provided or is supplemented via a monitoring model.

In one embodiment of the method, a rotational speed desired curve of the drives is calculated from a desired speed curve of a trajectory of the body using a kinematic transformation.

In one embodiment of the method, a cable force calculation is used.

In one embodiment of the method, a feedforward control procedure is used in particular for cable forces.

In one embodiment of the method, the cable forces for the feedforward control procedure of the drives are from a desired trajectory of the load via a mathematical model.

In one embodiment of the method, a load model and/or a drive train model is used so as to calculate the feedforward control procedure.

In one embodiment of the method, the closed-loop control procedure is performed in a cascade structure. In the case of the closed-loop drive control procedure, a PI closed-loop controller is used for the closed-loop rotational speed control procedure. In contrast to the closed-loop drive control procedure, the closed-loop position control procedure is performed in the coordinate system of the load. The adjusting variable of the closed-loop position control procedure is transferred by way of the kinematic transformation into the coordinate system of the drives. The closed-loop controller parameters of the closed-loop rotational speed control circuit are set in particular in a manner that is "optimal for damping" or "optimized for damping" with the result that a pendulum movement of the load is stimulated as little as possible. Owing to the frequency of the pendulum movement that is dependent upon the lifting height, the closed-loop control parameters are likewise adapted in dependence upon the lifting height.

In one embodiment of the method, it is possible with the aid of the model-based feedforward control procedure to apply the expected rotational speeds and torques to the respective comparators of the inner closed-loop control loops. It is only necessary for the closed-loop control concept to adjust the closed-loop control deviations that result from modelling inaccuracies and malfunctions.

In one embodiment of the method, the closed-loop drive control procedure (for example for m=8) is performed in dependence upon a lifting height, in other words is adapted to the lifting height, wherein the closed-loop drive control procedure is adapted to path dynamics of the movement of the body (load).

In one embodiment of the method, the drive closed-loop control procedure is performed in dependence upon path dynamics, wherein the change in the path dynamics results in particular from the lifting height or is predominantly determined by this said lifting height.

The closed-loop drive control procedure may control in a closed-loop manner in other words in dependence upon the path dynamics, which is in particular advantageous in the case of dynamic transmission behavior of the system. In this case, the closed-loop control path relates to in particular the lifting installation drives, the cables and the load (spreader beam and/or container). In this case, the cable lengths, the inertia, the masses and the cable rigidity are taken into consideration.

In one embodiment of the method, a position closed-loop control procedure is performed in the coordinates of the body, wherein in particular an adjusting variable for the load is converted via a kinematic transformation into drive coordinates.

In one embodiment of the method, in the case of a lifting cable installation, which is overdetermined and in particular has more drives than degrees of freedom that are to be positioned, the additional degrees of freedom are used for an optimization procedure of the feedforward control procedure.

In one embodiment of the method, the optimization procedure leads to the minimization of the maximum cable force.

In one embodiment of the method, the optimization procedure is drawn upon so as to maximize the magnitude of the tensioning for the cables of the lifting device.

In one embodiment of the method, the degrees of freedom of the position or orientation in the space for the optimization procedure are used so as to determine a position or a trajectory of the load in the space.

In one embodiment of the method, a maximum value of an acceleration is adapted in dependence upon a lifting height so as to calculate a trajectory.

In one embodiment of the method, a maximum value of an acceleration is adapted in dependence upon a position of the center of gravity of the body so as to calculate a trajectory.

In one embodiment of the method, a trajectory is selected and/or changed so as to minimize a maximum cable force (wherein the maximum cable force is a cable force that is not to be exceeded). A calculation of a trajectory in this case also falls under the term "a selection of a trajectory". In this case, the cable force relates to the force of a cable and/or the force of all the cables with which the body may be positioned in the space. The trajectory relates to the path of the body in the space and in particular also to the orientation of said body. The change of the position of the body (in other words in particular the load) In the space relates to the degrees of freedom of the position and/or orientation in the space. The reduction of the maximum cable force results in particular from an optimization procedure of the feedforward control procedure. The optimization procedure leads to the minimization of the maximum cable force, wherein the optimization procedure may in particular also be drawn upon so as to maximize the magnitude of the tensioning. It is thus possible in dependence upon the path of the body via the trajectory to minimize the cable force and/or to maximize the tension, wherein a maximum cable force is not exceeded. In particular more than six electric drives are provided for the adjustment of the cables. In particular, eight electric drives are provided so as to adjust the cables on which the body is located.

In one embodiment of the method, a controller is used in one of the described embodiments.

Different advantages may be provided by way of the controller for the open-loop control procedure and/or closed-loop control procedure or by way of the described method. It is thus possible to optimize the drive dimensioning of a lifting cable installation according to different criteria. It is thus possible by way of the resulting drive concept to achieve an exact positioning of the load (in particular container) using a closed-loop control accuracy of approximately 1 cm. It is thus possible by way of taking into consideration the following dependencies in the drive concept by way of adapting the closed-loop control parameters or the maximum acceleration values to achieve an optimized positioning:

In dependence upon the lifting height and/or
in dependence upon the load (mass) and/or
in dependence upon the position of the center of gravity of the load.

It is possible by way of the controller for the open-loop control procedure and/or closed-loop control procedure or by way of the described method in particular to improve an eight-cable lifting installation having individual drives. Moreover, it is possible for new paths to be provided for other applications and fields in crane automation.

The object that is the basis of the invention is also achieved by way of a computer program product that is embodied for the purpose of implementing the method or for the purpose of realizing the functions of the controller. The computer program product is in particular embodied for the purpose of implementing at least one embodiment of the method that is outlined above on a lifting device such as a crane.

The object that is the basis of the invention is also achieved by way of a lifting device that has the described controller and/or that is provided so as to implement the method.

BRIEF DESCRIPTION OF THE DRAWINGS

The invention is further explained below in an exemplary manner with the aid of the FIGS. 1 to 7. Identical features are provided with identical reference numerals. Features of individual embodiments may be combined with one another. In detail in the drawings

DETAILED DESCRIPTION OF PREFERRED EMBODIMENTS

Figure 1:
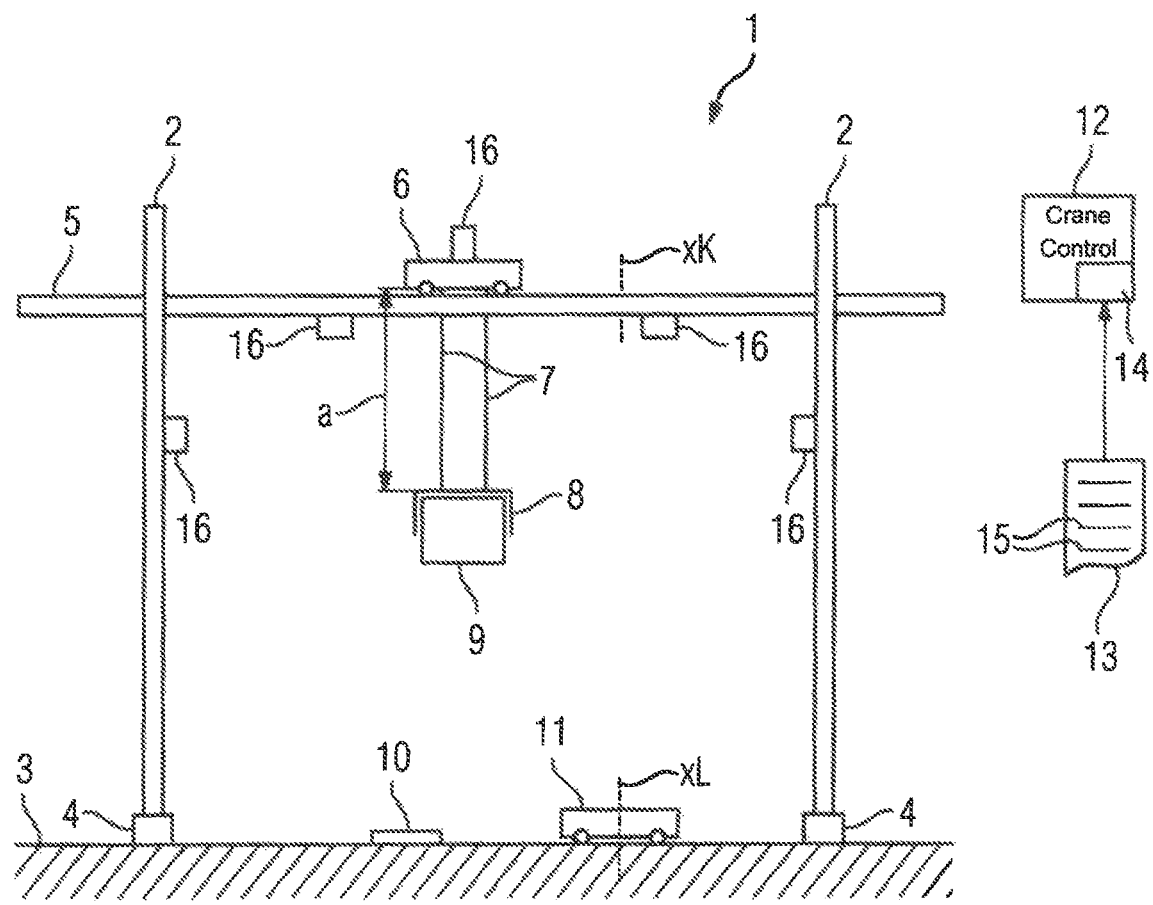
FIG. 1 shows a container bridge as an example for a lifting device.

The illustration according to FIG. 1 illustrates a container bridge 1. The container bridge 1 has a plurality of supporting columns 2 by means of which the container bridge 1 is arranged on a ground 3. The supporting columns 2 may be moved on rails 4. The movement direction is orthogonal with respect to the illustration in FIG. 1, in other words into or out of the image plane. The supporting columns 2 support a crossbeam 5. The crossbeam 5 extends parallel with respect to the ground 3 and therefore likewise horizontally. The container bridge 1 furthermore has a crane trolley 6. The crane trolley 6 may be moved on the crossbeam 5 relative to the ground. The movement direction of the crane trolley 6 is horizontal and orthogonal with respect to the movement direction of the supporting columns 2. The crane trolley 6 is connected via a cable system 7 to a spreader beam 8. It is possible by means of extending or shortening the cable system 7 to lower or raise the spreader beam 8. Where applicable, a container 9 that is gripped by the spreader beam 8 is also lowered or raised together with the spreader beam 8. At each point in time, a respective prevailing load of the crane trolley 6 corresponds to the mass of the spreader beam 8 in addition to the mass of the container 9 that is gripped by the spreader beam 8. There may be differences between the load of the crane trolley 6 and the loading of said crane trolley. The load is the object that is moved by the crane trolley 6, in other words the spreader beam 8 with or without container 9. The loading of the crane trolley 6 is the weight force that is exerted by way of the load onto the crane trolley 6. If, by way of example the empty spreader beam 8 is moved by the crane trolley 6 and the mass of the spreader beam 8 is five tons, the load of the spreader beam 8 and the loading is 5 tons. A load transferring site 10, 11 is illustrated. The load transferring site 10, 11 may be by way of example a stationary load transferring site 10, in other words a load transferring site that cannot be moved on the ground 3. A typical example of a load transferring site 10 of this type is a storage area for a container 9. Alternatively, the load transferring site 10, 11 may be a mobile load transferring site 11, in other words a load transferring site that may be moved on the ground 3. A typical example of a load transferring site 11 of this type is an AGV (automated guided vehicle). Furthermore, the transferring system has a crane controller 12. The crane controller 12 is one example for a controller. The transferring system is controlled in an open-loop manner by the crane controller 12. The crane controller 12 is programmed using a computer program 13. The computer program 13 is stored in machine-readable form in particular in a storage device 14 of the crane controller 12. The computer program 13 comprises machine code 15 that may be processed by the crane controller 12. The processing of the machine code 15 by way of the crane controller 12 ensures that the crane controller 12 implements a control method for the transferring system. Apart from that, sensors 16 such as cameras are illustrated. It is possible using these sensors by way of example to determine the position of the load 8 that has a gap a from the trolley 6.

Figure 2:
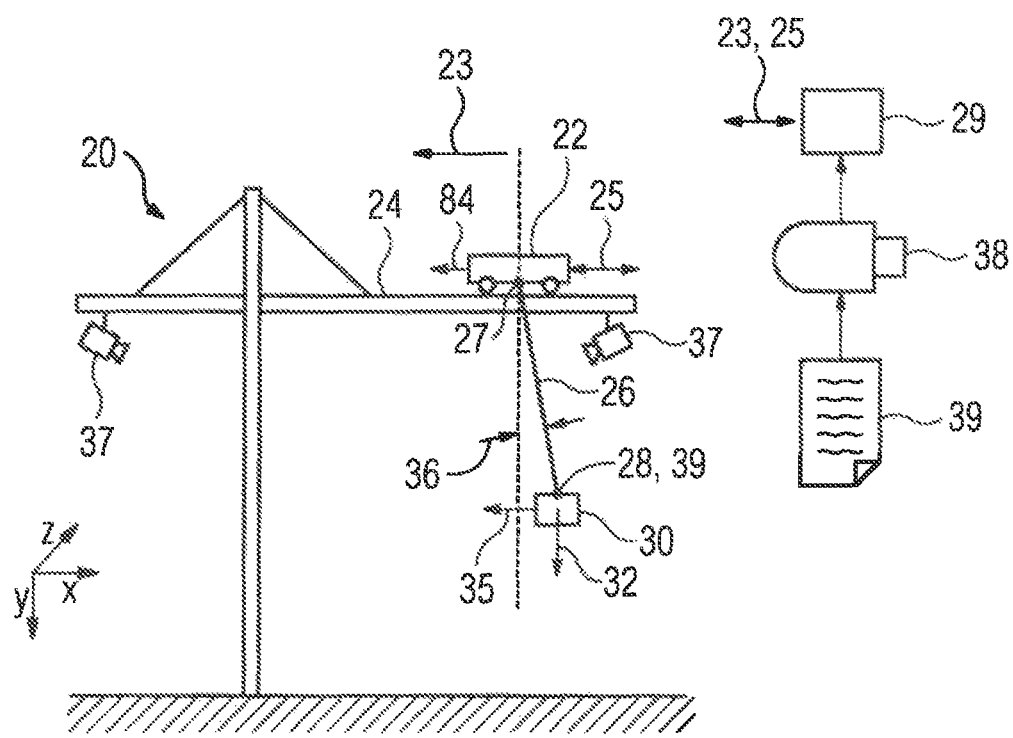
FIG. 2 shows a crane.

The illustration according to FIG. 2 illustrates schematically in a side view a crane trolley 22 that is associated with a crane 20 as a further example for a lifting device. The crane 20 has a guiding rail 24 on which the crane trolley 22 is movably arranged along a movement axis 25. The crane trolley 22 comprises a crane trolley drive that provides a drive torque and renders possible a movement 23 along the movement axis 25. A load 30 is suspended on the crane trolley 22 via two or more lifting installation cables 26. The lifting installation cables 26 are respectively fastened to crane-trolley side suspension points 27 and to load-side suspension points 28. There is a bearing reaction in each of the crane trolley side suspension points 27, said bearing reaction comprising bearing reaction forces and/or bearing reaction torques depending upon the construction of the respective crane trolley side suspension point 27. Each of the lifting cable installations 26 is further allocated a lifting drive 31 via which the associated lifting installation cable 26 may be reeled on or reeled off. The procedure of reeling on or reeling off a lifting installation cable 26 reduces or increases the free length of said lifting installation cable. The load 30 is deflected 35, 32 from vertical by way of the movement 23 of the trolley crane 22. A distance 33 between a load reference point 29 and a crane trolley reference point 21 is produced by way of the deflection of the load 20. A pendulum movement 36 is possibly produced by means of the deflection of the load 30 and said pendulum movement may impede the placement of the load 30. The crane trolley 22 is provided with a controller 29 on which a computer program product 39 is stored in an executable manner. The computer program product is designed for the purpose of implementing at least one embodiment of the method in accordance with the invention. It is possible for signals of a measuring apparatus 38 to be taken into consideration using the computer program product.

Figure 3:
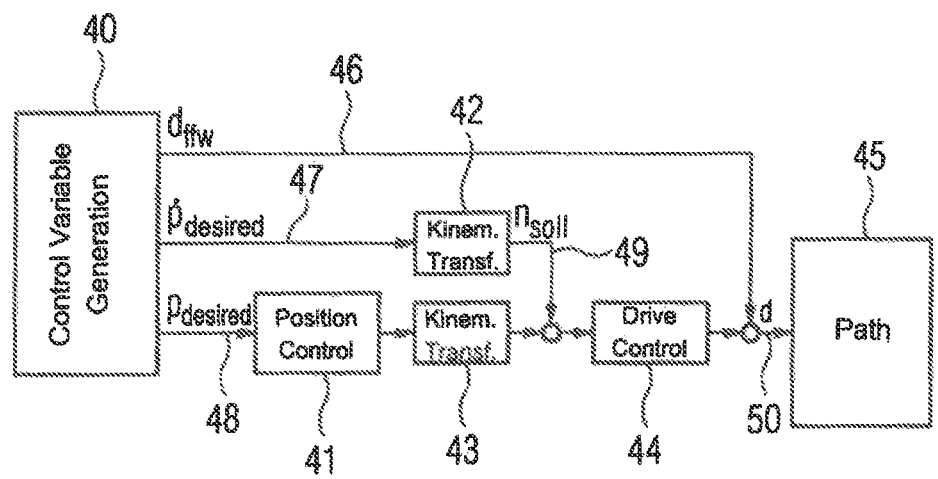
FIG. 3 shows an open-loop control concept and closed-loop control concept.

The Illustration as claimed in FIG. 3 illustrates an open-loop control concept and a closed-loop control concept. An open-loop control procedure and adjusting variable generating procedure 40 is illustrated, which outputs parameters in dependence upon a position p. The position relates in particular to a spatial position of a point (XC,YC,ZC) and an orientation $(\alpha,\beta,\gamma)$ of a body in the space with p=[XC,YC, ZC,$\alpha,\beta,\gamma]^T$. It is possible for torques d=$[d_1, \ldots, d_m]^T$ 50 to be provided via a number of m drive trains having electric motors in order to by way of example guide a path 45 (the cable lifting installation) on the predetermined course. An optimized torque curve $d_{ffw}=[d_{ffw,1}, \ldots, d_{ffw,m}]^T$ 46 is calculated on the open-loop control side with the aid of a mathematical model. For the feedforward control procedure of the rotational speed $n_{desired}=[n_{desired,1}, \ldots, n_{desired,m}]^T$ with the aid of the kinematic transformation the desired speeds are transferred from the six-dimensional coordinate system of the load into the m-dimensional coordinate system of the drives. The desired value position p_desired thus moves into a closed-loop position control procedure 41. Afterwards, a kinematic transformation 43 is performed, whereupon this value is processed together with the desired rotational speed $n_{desired}$ in a closed-loop drive control procedure 44. The rotational speeds $n_{desired}$ and torques $d_{ffw}$ that are determined for example via a mathematical model in the feedforward control paths are connected to the respective comparators of the closed-loop control loops. The desired rotational speed $n_{desired}$ results from the first derivative of p_desired 47 and a subsequent kinematic transformation 42.

Figure 4:
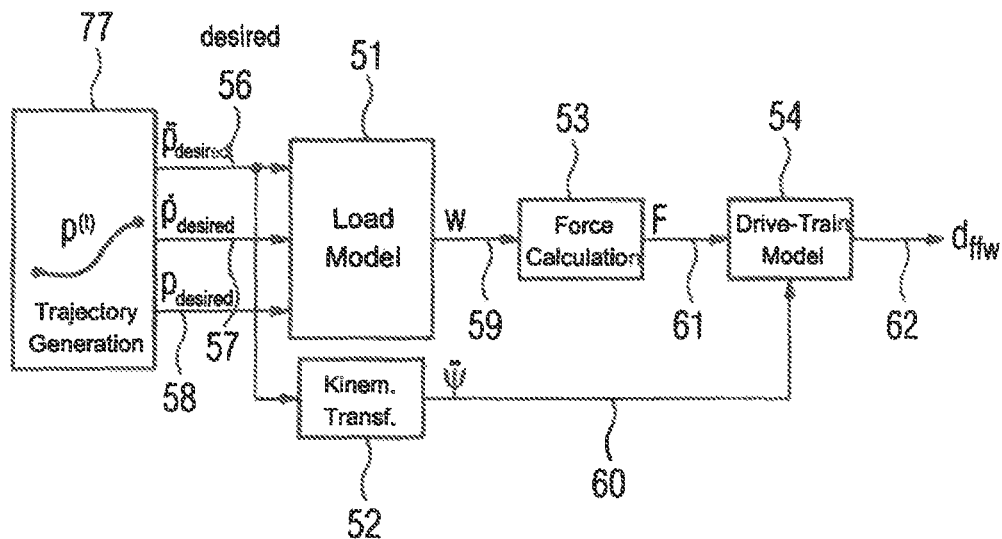
FIG. 4 shows an open-loop control concept with a cable force calculation.

The illustration according to FIG. 4 illustrates a further part of an open-loop control concept. A load model 51 is illustrated in addition to a trajectory generating procedure 77. A desired course is provided by means of the desired values of p 58, $\dot{p}$ 57, $\ddot{p}$ 56. The forces F 61 that act upon the load are calculated using the six-dimensional movement equation 59 $w=M(p)\ddot{p}+N(\dot{p},p)+G(p)$
with:
M(p) the mass matrix
$N(\dot{p},p)$ the matrix of the centrifugal force and Coriolis force
G(p) the matrix of the weight forces
from the desired course $(p,\dot{p},\ddot{p})$ 58, 57, 56, wherein a load model 51 is provided for this purpose. The force vector w 59 relates to the load coordinates. The forces 61 are provided via a cable force calculation 53. In the open-loop control concept, an optimized torque feedforward control procedure $d_{ffw}=[d_{ffw,1}, \ldots, d_{ffw,m}]^T$ 62 is calculated with the aid of a mathematical load model for the m drive units. For this purpose, it is necessary to know the mass of the load and the position of the mass center point. An optimized torque feedforward control procedure $d_{ffw}$ is calculated for a given desired course $(p,\dot{p},\ddot{p})$ in load coordinates with the aid of the mathematical model on the basis of a model 54 for the drive train. It is possible using the equilibrium condition $A^T(p) F=w$ to transform the six-dimensional force vector w into the cable force vector F. The cable force vector $F=[F_1, \ldots, F_m]^T$ includes the amount of cable force of each cable in the direction of the drive coordinates (cf. FIG. 5). The equilibrium condition is established with the aid of the geometric arrangement of the cables. The matrix $A^T(p)$ includes inter aa the m normalized cable force direction vectors and the position of the points of application of the force.

The angular acceleration of the m drive trains 60 $\ddot{\varphi}=[\ddot{\varphi}_1, \ldots, \ddot{\varphi}_m]^T$ results from a kinematic transformation 52 of the second derivation of $p_{desired}$.

Figure 5:
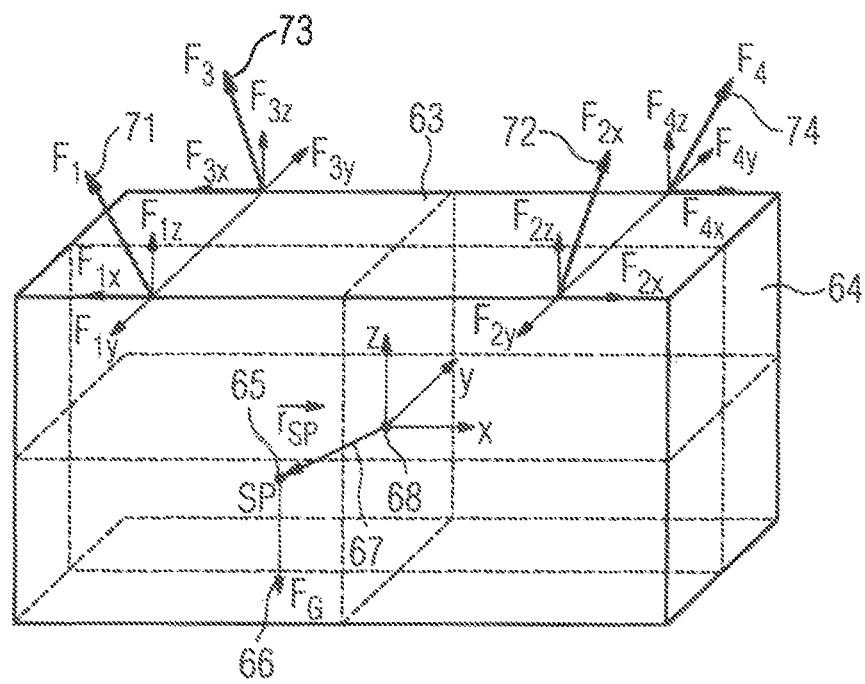
FIG. 5 shows forces on a spreader beam.

FIG. 5 illustrates in an exemplary manner a definition of the force vectors for the equilibrium conditions in a simplified case that may be easily illustrated of a load suspension using 4 cables. The forces 71, 72, 73, 74 are illustrated on a spreader beam 63, which grips a container 64, having a reference coordinate system 68, a center of gravity SP 65 and a displacement 67 of the center of gravity with respect to the zero point of the reference coordinate system. More than 4 cables, such as 2 or more additional cables 81, 82 providing respective additional force vectors $F_5$, $F_6$ may be attached to the container or load, whereby the number of cables may exceed the degrees of freedom of the load.

Figure 6:
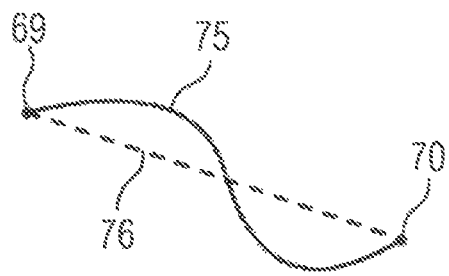
FIG. 6 shows an optimized course.

The illustration according to FIG. 6 illustrates an optimized course 75. By way of example, a shortest path 76 between a start point 69 and an end point 70 may be optimized in relation to maximum cable forces and the optimized course 75 results from said optimization procedure.

Figure 7:
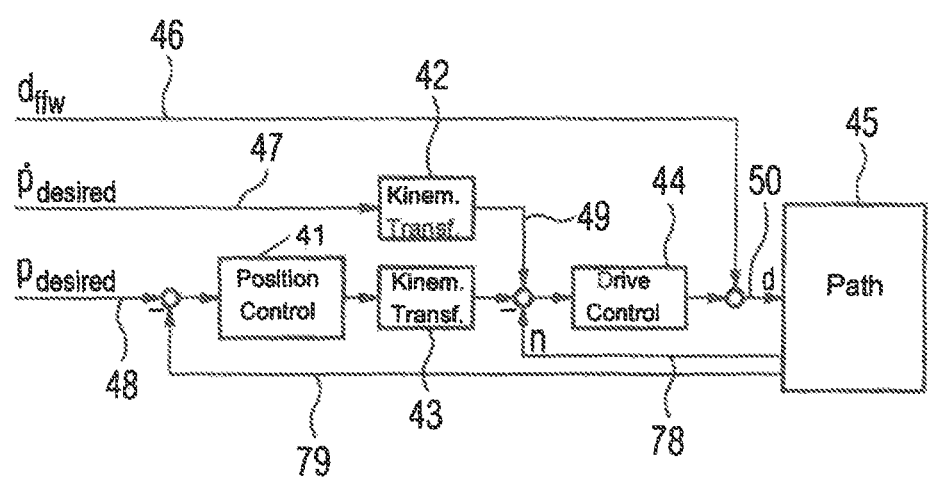
FIG. 7 shows a closed-loop control structure.

The illustration according to FIG. 7 illustrates a closed-loop control structure and is based on FIG. 3. In FIG. 7, a feedback 79 of the position p is illustrated which is subtracted from the value 48 $p_{desired}$ and is used in the closed-loop position control procedure 41. The output of the closed-loop position control procedure is kinematically transformed 43 and is linked to the feedback 78 of an actual rotational speed n of the corresponding electric drive that is to be controlled in a closed-loop manner.

The invention claimed is:

1. A controller controlling a plurality of drives of a lifting device positioning a body, said controller being configured to perform a kinematic transformation of a spatial position and an orientation of the body, with the lifting device being overdetermined by having more drives than degrees of freedom of the body to be positioned, the controller further comprising an optimizing device for optimizing cable forces by at least one of minimizing a maximum cable force, by maximizing a minimal cable force, and by distributing the cable forces equally onto the cables.

2. The controller of claim 1, further comprising a closed-loop position controller having an input for the spatial position and an input for the orientation position.

3. The controller of claim 1, further comprising a first model for the body.

4. The controller of claim 1, further comprising a cable force calculator.

5. The controller of claim 1, further comprising a second model for a drive train.

6. The controller of claim 1, further comprising a feed-forward control procedure.

7. A method for controlling a lifting device, comprising:
    performing a kinematic transformation of spatial position and orientation coordinates of a body to be lifted by at least six drives of a lifting device,
    controlling the at least six drives by way of closed-loop control, and
    with the kinematic transformation, computing from a desired speed curve of a trajectory of the body a rotational speed desired value curve of the drives.

8. The method of claim 7, wherein the at least six drives are electric drives operating on cables connected to the body, and wherein a distribution of forces operating on the cables is over-determined.

9. The method of claim 8, further comprising computing a cable force operating on the cables.

10. The method of claim 9, further comprising determining the cable force with a feedforward control procedure.

11. The method of claim 10, wherein the feedforward control procedure employs a load model and/or a drive train model.

12. The method of claim 10, wherein the lifting device is overdetermined by having more drives than degrees of freedom of the body to be positioned, the method further comprising using additional degrees of freedom for optimizing of the feedforward control procedure of the cable force.

13. The method of claim 7, further comprising
controlling the position of the body in the spatial position and orientation coordinates of the body, and
converting a manipulated variable for the load into drive coordinates by way of the kinematic transformation.

14. The method of claim 7, further comprising calculating the trajectory by adapting a maximum value of an acceleration of the body in dependence of a lifting height of the body.

15. The method of claim 7, further comprising calculating the trajectory by adapting a maximum value of an acceleration of the body in dependence of a position of a center of gravity of the body.

16. The method of claim 7, further comprising selecting or changing the trajectory so as to minimize a maximum cable force.

17. The method of claim 7, further comprising performing the kinematic transformation and controlling the at least six drives with a controller configured to perform a kinematic transformation of the body in dependence of a spatial position and an orientation position of the body, wherein the lifting device is overdetermined by having more drives than degrees of freedom of the body to be positioned.

18. A method for controlling a lifting device, comprising:
performing a kinematic transformation of spatial position and orientation coordinates of a body to be lifted by at least six drives of a lifting device,
controlling the at least six drives by way of closed-loop control, and
controlling and adapting the drives in dependence on a lifting height or path dynamics of the body, with the lifting height effecting a change of the path dynamics.

* * * * *